Dec. 4, 1951     H. W. TETER     2,577,492

MEASURING INSTRUMENT, INCLUDING REGISTERING MEANS

Filed July 3, 1948

INVENTOR.
Howard W. Teter
BY Harold E. Cole
Attorney

Patented Dec. 4, 1951

2,577,492

UNITED STATES PATENT OFFICE 2,577,492

MEASURING INSTRUMENT, INCLUDING REGISTERING MEANS

Howard W. Teter, Wellesley, Mass.

Application July 3, 1948, Serial No. 36,936

4 Claims. (Cl. 116—129)

This invention relates to a thermometer with mechanism to register minimum and maximum temperatures.

The principal object of my invention is to provide, in conjunction with a thermometer, simple, yet accurate mechanism, that will register the lowest temperature or the highest temperature. Also it will register both the lowest and highest temperatures in the same period of time if the thermometer pointer moves beyond its starting point in two different directions within that time.

A further object is to provide improved registering hands that move easily when urged by the thermometer pointer, yet will not float from their position involuntarily and thus make untrue recordings of maximum or minimum temperatures.

Another object is to so construct the parts of my mechanism that they are economical to manufacture and assemble, yet will continue in good working order indefinitely.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

Figure 1:
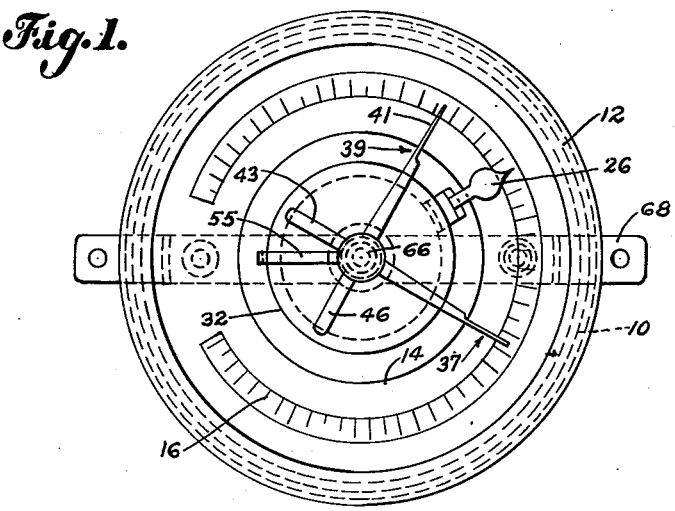
Figure 1 is a top plan view of my thermometer.
Figure 2:
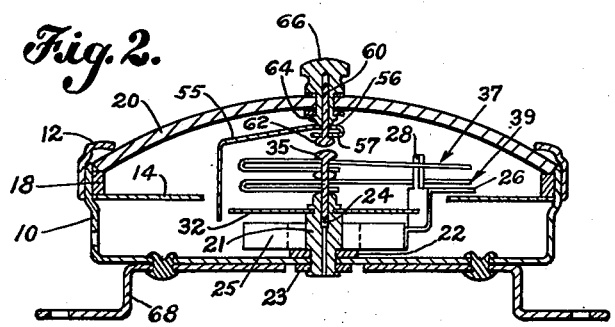
Figure 2 is a sectional view of my thermometer taken through the center from top to bottom.
Figure 3:
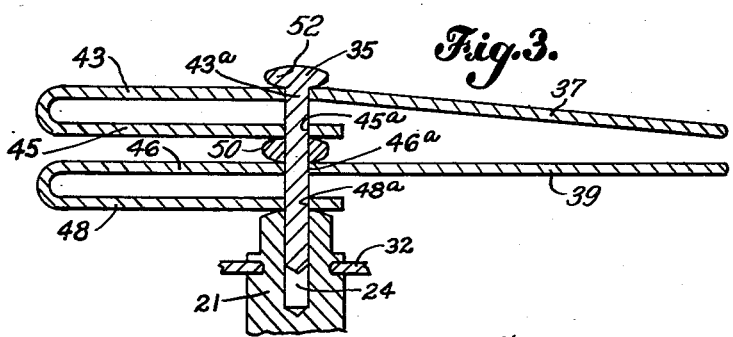
Figure 3 is an enlarged, vertical, sectional view showing the maximum and minimum registering hands and their supporting parts.

As illustrated, my thermometer has the usual casing or external support 10 having a bezel 12. It has the usual dial or face 14 bearing the usual gradation marks 16 which enable one to read the temperature. A snap ring 18 holds said dial 14 in place in said casing 10. The usual transparent glass or crystal 20 set in said casing 10 protects the mechanism and serves as a top.

A supporting member or post 21 is centrally held to said casing by washers 22 and 23. It has a vertical hole 24 extending only part way down therein. A well known, bi-metal temperature responsive coil 25 is mounted on said post 21, and extending laterally and upwardly from which and above said dial 14, is the usual temperature pointer 26. Attached to or integral with said pointer 26 and extending upwardly therefrom is a pusher pin 28. Mounted on said post 21 above and concealing said temperature responsive coil 25 is a disc 32.

A supporting staff or shaft 35 is fixedly set in said post 21, and rotatably mounted thereon is an upper or maximum registering hand or arm 37 and a lower or minimum registering hand or arm 39. These hands 37 and 39 are preferably painted different colors such as red and green. Said hand 37 has a free or pointer end 41 and upper and lower portions 43 and 45 spaced vertically apart and forming a looped portion. There are holes 43a and 45a in said upper and lower portions 43 and 45 respectively. Said hand 39 likewise has upper and rear portions 46 and 48 that form a loop in which are holes 46a and 48a respectively. Said staff 35 extends through said holes 43a, 45a, 46a and 48a, and it is fixedly driven into said holes 29 in the supporting post 24. Said four holes in the registering hands are of such size relative to said staff 35 that said registering hands 37 and 39 may be rotated thereon when lateral pressure by said pusher pin 28 is applied to them; but otherwise they will not move.

Figure 4:
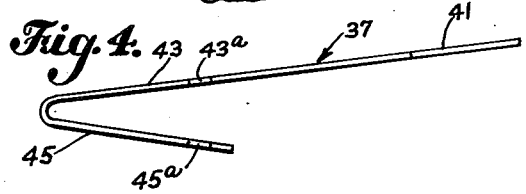
Figure 4 is an enlarged front elevational view of a registering hand only, showing its normal position with the two end portions extending diagonally in opposite directions from the loop.

Said registering hands 37 and 39 are made of spring material, such as spring tempered brass, and normally the higher portion extends diagonally upward from the loop and the lower portion diagonally downward as illustrated in Figure 4 of the drawings. When mounted on said staff 35 they are slightly deformed, and thus are under tension. This is effected by the top of said supporting post 21 and by a collar 50 mounted on said staff 35 between said registering hands 37 and 39 by an enlarged head or collar 52 at the top of said staff 35. The looped portions 43, 45, and 46, 48 of the registering hands are thus kept in a slightly abnormal position, since the upper and lower portions are pressed towards each other, hence they bind somewhat on said staff 35 to thereby provide a friction fit. Both of said hands 37 and 39 are in the rotative path of said pusher pin 28.

It should be noted that said upper registering hand 37 has a cut-out or recessed portion on its right side at the end extremity of said hand while said lower registering hand 39 has a cut-out or recessed portion at its left side at the end extremity thereof. These narrow end portions make it possible to move both said hands 37 and 39 directly over the top end of said temperature pointer 26 hence the slightest movement, in either direction, of the temperature pointer 26 causes said pusher pin 28 to push one of said registering hands in the direction said pointer 26 moves.

A resetting finger 55 which extends laterally outward and then downwardly, preferably has a looped rear end formed of an upper portion 56 and a lower portion 57 spaced apart and each having holes therein. These portions 56 and 57 normally spring diagonally apart similar to the registering hand rear portions 43, 45, hence said resetting finger 55 is frictionally mounted on a shaft 60. The latter has a head or collar 62 at its lower end below said looped portions 56 and 57, and there is a lower neck 64 of a control knob 66, later described, constricting it above, thus holding said looped end under tension on said shaft 60. This tension is greater than that of the registering hands 37 and 39 on said staff 35 since said resetting finger 55 must rotatably move said hands to reset them. A control knob 66 is fixed on said shaft 60, hence when said knob is rotated said resetting finger 55 is brought into contact with either of said registering hands 37 and 39 desired and that one is moved to a position over said temperature pointer 26 to thereby prepare to make a new recording. Should said resetting finger 55 be moved forcibly against said temperature pointer 26 said shaft 60 will commence to slip and rotate in said finger 55 when the force of the friction fit of said looped portions 56 and 57 on said shaft 60 is overcome by resistance of said indicator pointer 26.

A bracket 68 to mount my thermometer to a wall or other place is attached to said casing 10 by rivets 22.

Said holes 43a, 45a, and 46a, 48a, in said registering hands may be drilled at an angle so that they provide the desired friction fit on said staff 35, even though said looped portions are not distorted when on said staff.

What I claim is:

1. A measuring instrument including a moving system having a main indicating pointer embodying a push member extending angularly therefrom, a shaft separate from said pointer having an enlarged portion, a supporting member in which said shaft is fixed, a registering arm embodying two rear portions shaped to form a loop, and each said rear portion having a hole therein, said shaft extending through said rear portion holes with said rear portions bearing against said enlarged portion and supporting member and said shaft in frictional engagement therewith and being rotatable on said shaft when pressure is applied to said registering arm, said arm being so positioned that it is in a path of movement of said pointer push member.

2. A measuring instrument including a moving system having a main indicating pointer embodying a push member extending angularly therefrom, a shaft separate from said pointer having an enlarged portion, a supporting member in which said shaft is fixed, a registering arm embodying two rear portions of resilient material shaped to form a loop and each said rear portion having a hole therein, said shaft extending through said rear portion holes with said rear portions bearing against said enlarged portion and supporting member and said shaft in frictional engagement therewith and being rotatable on said shaft when pressure is applied to said registering arm, said arm being so positioned that it is in a path of movement of said pointer push member.

3. A measuring instrument including a moving system having a main indicating pointer embodying a push member extending angularly therefrom, a shaft separate from said pointer having an enlarged portion, a supporting member in which said shaft is fixed, a registering arm embodying two rear portions shaped to form a loop and normally extending in opposite diagonal directions, each said rear portion having a hole therein, said shaft extending through said rear portion holes with said rear portions extending substantially parallel to each other and bearing against said enlarged portion and supporting member and said shaft in frictional engagement therewith and being rotatable on said shaft when pressure is applied to said registering arm, said arm being so positioned that it is in a path of movement of said pointer push member.

4. A measuring instrument including a moving system having a main indicating pointer embodying a push member extending angularly therefrom, a shaft separate from said pointer having an enlarged head, a collar on an intermediate portion of said shaft, a supporting member in which said shaft is fixed, a maximum registering arm and a minimum registering arm which are at opposite sides of said pointer push member, each said arm embodying two rear portions shaped to form a loop and each said rear portion having a hole therein, said shaft extending through all said rear portion holes with one pair of said rear portions bearing against said head and collar and another pair of said rear portions bearing against said collar and supporting member and said shaft in frictional engagement therewith and being rotatable on said shaft when pressure is applied to said registering arm, said arms being so positioned that they are in a path of movement of said pointer push member.

HOWARD W. TETER.

REFERENCES CITED

The following references are of record in the file of this patent:

UNITED STATES PATENTS

| Number | Name | Date |
|---|---|---|
| 68,681 | Ames | Sept. 10, 1867 |
| 302,908 | Haight | Aug. 5, 1884 |
| 958,424 | Niemann | May 17, 1910 |
| 2,048,512 | Oakley | July 21, 1936 |
| 2,457,286 | Tollefsen et al. | Dec. 28, 1948 |